United States Patent [19]
Date

[11] Patent Number: 5,463,612
[45] Date of Patent: Oct. 31, 1995

[54] OBJECTIVE LENS DRIVE APPARATUS USED IN OPTICAL INFORMATION RECORDING/REPRODUCING APPARATUS

[75] Inventor: Nobuaki Date, Kawasaki, Japan

[73] Assignee: Canon Kabushiki Kaisha, Tokyo, Japan

[21] Appl. No.: 298,313

[22] Filed: Sep. 1, 1994

Related U.S. Application Data

[63] Continuation of Ser. No. 983,723, Dec. 1, 1992, abandoned.

[30] Foreign Application Priority Data

Dec. 5, 1991 [JP] Japan ..................... 3-348357

[51] Int. Cl.$^6$ ..................................... G11B 7/08
[52] U.S. Cl. ..................... 369/219; 369/44.16
[58] Field of Search ..................... 369/215, 219, 369/258, 44.16, 220, 247, 44.14; 360/106

[56] References Cited

U.S. PATENT DOCUMENTS

| | | | |
|---|---|---|---|
| 4,554,653 | 11/1985 | Malissin et al. | |
| 4,613,962 | 9/1986 | Inoue et al. | |
| 4,680,743 | 7/1987 | Araki | 369/219 |
| 4,798,447 | 1/1989 | Jansen et al. | 350/255 |
| 4,862,441 | 8/1989 | Yumura et al. | 369/220 |
| 4,868,696 | 9/1989 | Hammer et al. | 360/106 |
| 5,068,844 | 11/1991 | Tanaka | 369/44.16 |
| 5,124,965 | 6/1992 | Mizuno et al. | 369/44.22 |
| 5,134,727 | 7/1992 | Cau | 369/44.16 |
| 5,151,890 | 9/1992 | Yonekubo | 369/44.14 |
| 5,161,067 | 11/1992 | Tomiyama et al. | 369/44.16 |

FOREIGN PATENT DOCUMENTS

| | | | |
|---|---|---|---|
| 0350225 | 1/1990 | European Pat. Off. | |
| 60-13332 | 1/1985 | Japan | 369/44.16 |
| 63-311634 | 12/1988 | Japan | 369/44.16 |
| 4-21932 | 1/1992 | Japan | 369/44.16 |

OTHER PUBLICATIONS

Patent Abstracts of Japan, Kokai No. 57–110069, vol. 6, No. 200, Oct. 1982.

*Primary Examiner*—Stuart S. Levy
*Assistant Examiner*—George J. Letscher
*Attorney, Agent, or Firm*—Fitzpatrick, Cella, Harper & Scinto

[57] ABSTRACT

An objective lens drive apparatus is used in an optical information recording/reproducing apparatus to conduct recording and reproducing of information by radiating a light spot onto a disk recording medium. The objective lens drive apparatus includes an objective lens, an objective lens holding member for holding the objective lens, and a support member for supporting the objective lens holding member movable in a radial direction of the recording medium. In the objective lens drive apparatus, the support member includes a first plate spring fixed to the drive apparatus at one end thereof and extending in a direction perpendicular to a movement direction of the objective lens holding member away from the objective lens holding member, and a second plate spring fixed to a side of the objective lens holding member at one end thereof and extending in the direction perpendicular to the movement direction of the objective lens holding member to be connected to the first plate spring at the other end thereof.

6 Claims, 7 Drawing Sheets

OBJECTIVE LENS DRIVE APPARATUS USED IN OPTICAL INFORMATION RECORDING/REPRODUCING APPARATUS

This application is a continuation of prior application, Ser. No. 07/983,723 filed Dec. 1, 1992, now abandoned.

BACKGROUND OF THE INVENTION

1. Field of the Invention

The present invention relates mainly to a movable optical head in a separated optical head system, that is, an objective lens drive apparatus in an optical information recording apparatus of magneto-optical type or of optical type.

2. Related Background Art

A conventional objective lens drive apparatus of such a type is structured such that, in optically conducting information recording by radiating a light spot onto a recording medium in the form of a disk, an actuator for an objective lens is held along a guide rail to conduct a tracking control of the objective lens for a light spot in a radial direction of the recording medium and that the actuator is controlled to move the objective lens with a proper driving force in the seeking direction or in the tracking direction.

In order to urge a weight reduction in a movable portion or the optical head For high speed processing of the information recording apparatus, many efforts have been made to reduce and simplify optical elements on the actuator side of the objective lens and the movable portion of the tracking and focusing control system as much as possible. A new structure for further weight reduction is proposed to omit the mounting of elements for a fine tracking function on the movable portion while using a galvano mirror, as presented in presentations at academic conferences.

Even in the information recording apparatus employing the above-mentioned galvano mirror, the objective lens drive apparatus, however, requires an actuator for driving the objective lens in the focusing direction and a carriage for moving the actuator in the seeking direction. Therefore, satisfactory weight reduction has not been attained even in such an apparatus yet.

SUMMARY OF THE INVENTION

The present invention has been accomplished taking into account the above circumstances. It is an object of the present invention to provide an objective lens drive apparatus enabling high speed access with a satisfactory weight reduction.

In the present invention, an objective lens drive apparatus, which is used in an optical information recording/reproducing apparatus to conduct recording and reproducing of information by radiating a light spot onto a disk recording medium, comprises an objective lens, an objective lens holding member for holding the objective lens, and a support member for supporting the objective lens holding member movable in a radial direction of the recording medium, in which the support member comprises a first plate spring fixed to the drive apparatus at one end thereof and extending in a direction perpendicular to a movement direction of the objective lens holding member away from the objective lens holding member, and a second plate spring fixed to a side of the objective lens holding member at one end thereof and extending in the direction perpendicular to the movement direction of the objective lens holding member to be connected to the first plate spring at the other end thereof.

Details of the present invention will be explained with embodiments thereof as descried below.

DETAILED DESCRIPTION OF THE PREFERRED EMBODIMENTS

Figure 1:
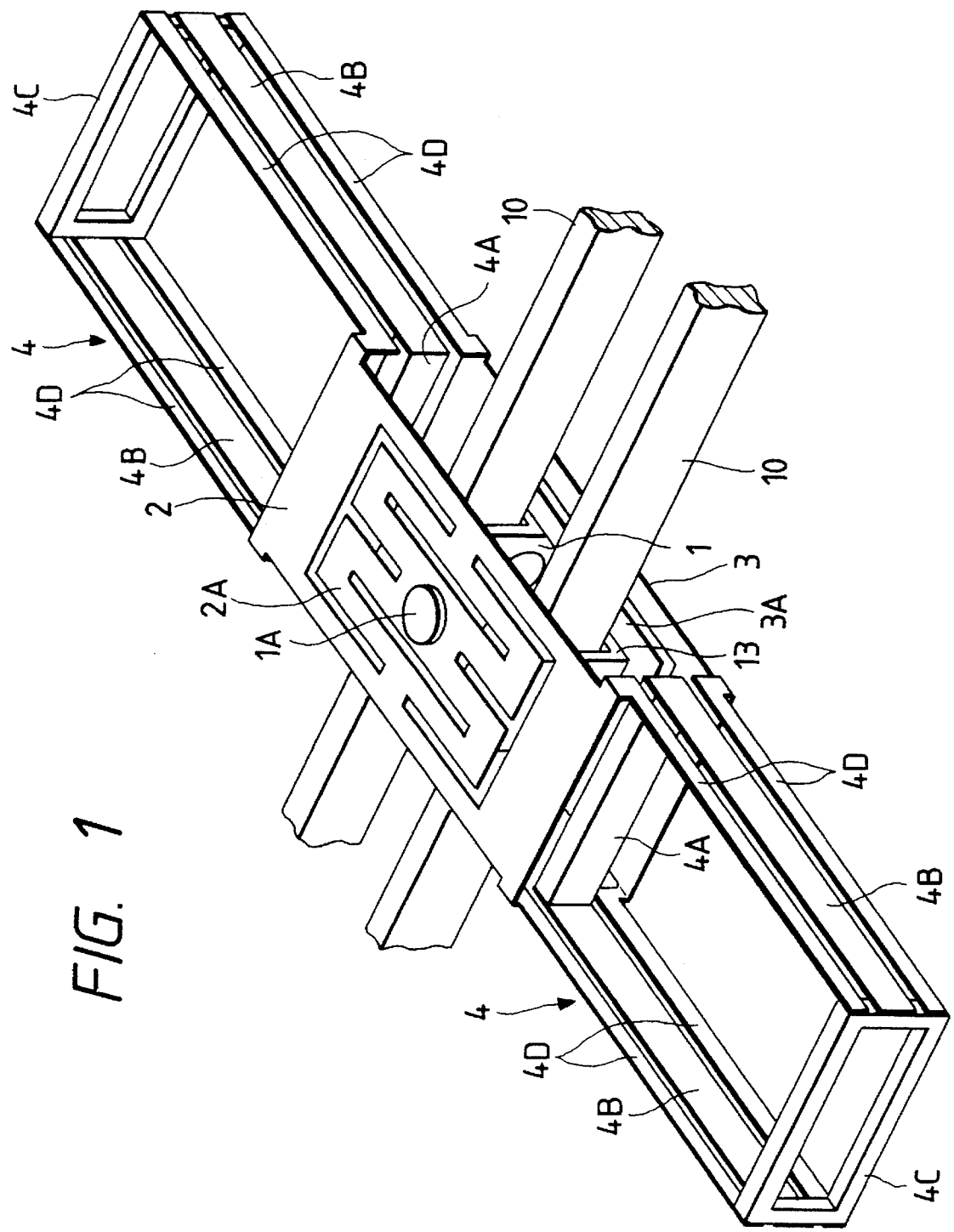
FIG. 1 is a perspective view to show a first embodiment of an objective lens drive apparatus according to the present invention.
Figure 2:
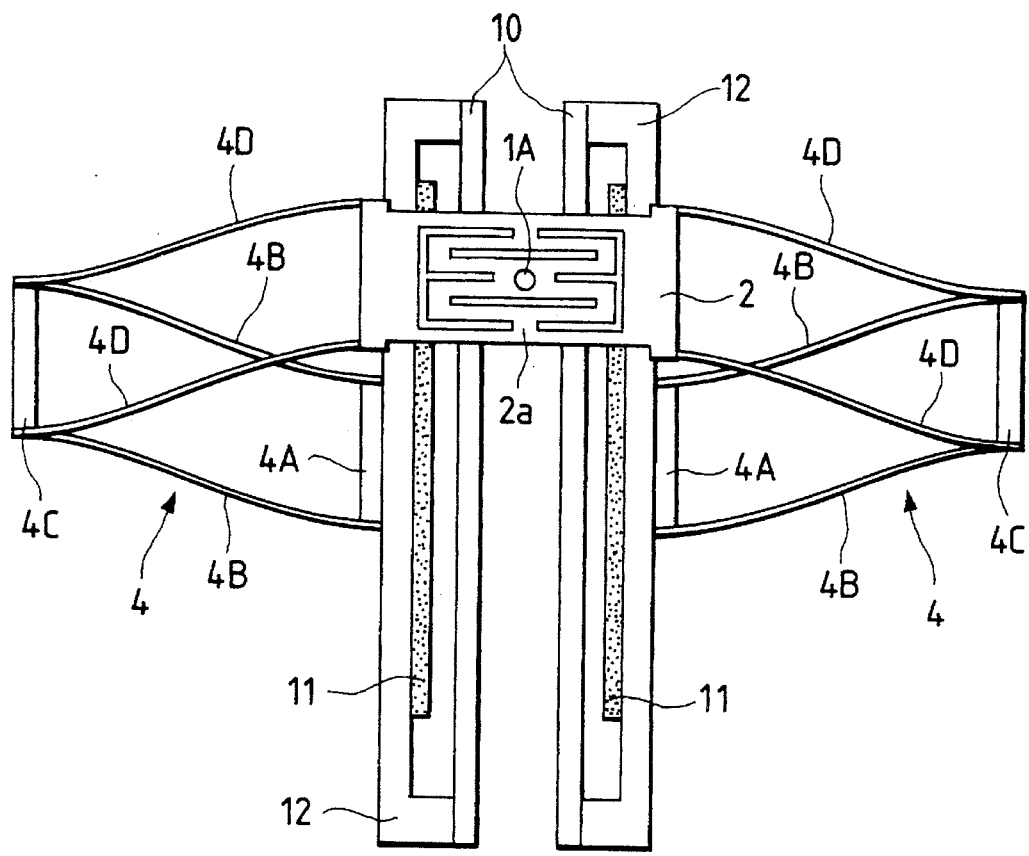
FIG. 2 is a top plan view of the apparatus as shown in FIG. 1.
Figure 3:
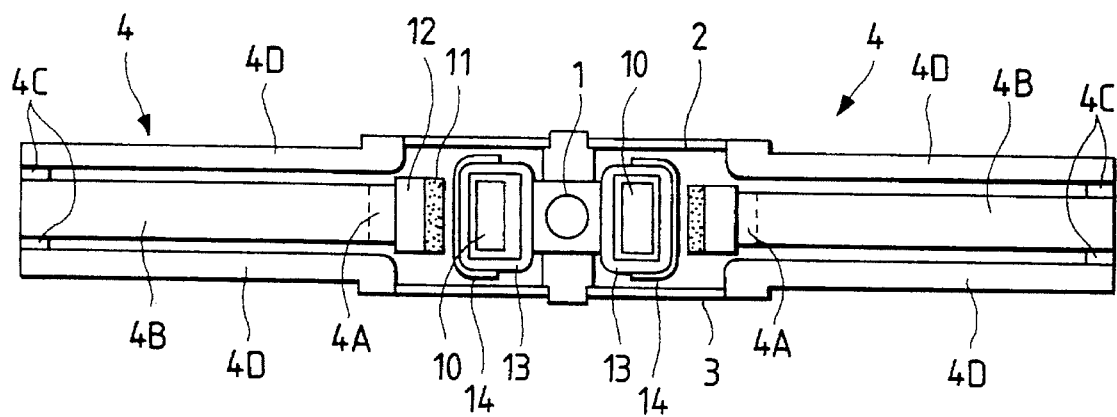
FIG. 3 is an end view as seen from an end of the apparatus as shown in FIG. 1.

A first embodiment of an objective lens drive apparatus according to the present invention is specifically explained in the following with reference to FIG. 1 to FIG. 3. In FIGS. 1 to 3, reference numeral 1 designates an objective lens holder, which has an objective lens 1A and a mirror (not shown) to direct a laser beam from a stationary optical system (not shown) toward the objective lens 1A and to return reflection light to the optical system. Coils 13, 13 for tracking are mounted on either side of the objective lens holder 1 while surrounding inner yokes 10, 10 extend parallel to the tracking direction (the seeking direction), respectively. In addition, coils 14, 14 for focusing are mounted on respective one sides of the coils 13, 13. Outer yokes 12, 12, which are parallel to the inner yokes 10, 10, are connected at both ends to the inner yokes 10, 10, respectively. Magnets 11, 11 are mounted on the outer yokes 12, 12 to face the inner yokes, which constitute magnetic circuits required to provide respective magnetic fluxes acting perpendicular to the coils 13, 13. The inner yokes 10, 10 and the outer yokes 12, 12 are fixed to a base of the apparatus.

Rectangular spring members 2 and 3 for focusing are mounted to the objective lens holder 1, in which gimbal springs 2A and 3A are formed by blanking. Both of the left and right ends of each of the spring members in the direction perpendicular to the tracking direction are supported by respective composite parallel plate spring mechanisms 4, 4, respectively in the first embodiment (see FIG. 1 to FIG. 3). Each of the composite parallel plate spring mechanisms is comprised of a stationary base member 4A fixed to a back plane of the outer yoke 12, first parallel plate springs 4B, 4B fixed at a respective one end thereof to either end of the stationary base member 4A (the both ends in the tracking direction) and extending in the direction perpendicular to the tracking direction, a movable frame member 4C to which the respective other ends of the parallel plate springs 4B, 4B are fixed, and second parallel plate springs 4D, 4D fixed at one end thereof to respective corners of the movable frame member 4C and connected at the other end thereof to the spring members 2 and 3 while extending in parallel with the parallel plate springs 4B, 4B.

As apparent from the drawings, a necessary driving force is generated by effects of a direct current applied to the coils 13, 13 and of the magnetic fluxes of the magnetic circuits, so that while the objective lens holder 1 moves along the inner yokes 10, 10, the parallel plate springs 4B and 4D are deflected to move the objective lens holder 1 in the tracking direction while supporting the objective lens holder 1. In the movement in the present invention, the parallel plate springs 4B, 4D in the composite parallel plate spring mechanisms 4 are deflected when the objective lens holder 1 moves in the tracking direction. In the movement, since the base ends of the parallel plate springs 4B are fixed to the stationary base member 4A, the ends on the movable frame member 4C side would trace a circular motion. To the contrary, the ends of the plate springs 4D connected to the spring members 2, 3 would trace a counter circular motion against that. As a result, a composite motion, corrected to cancel the traces of the circular motion, with each other, will be on a correct linear trace to move the objective lens holder 1 linearly. In this embodiment, since the objective lens holder 1 is supported by cooperation of the left and right composite parallel plate spring mechanisms, a higher linearity may be assured in movement in the tracking direction. Consequently, an optical axis of a laser beam is never offset from the center of the objective lens, and there is no possibility of a decrease in light intensity, enabling stable reading and writing of information.

Further, in this embodiment, a vertical force is generated by the effects of the direct current applied to the coils 14, 14 and the magnetic fluxes of the magnetic circuits to make the gimbal springs 2A, 3A deflected, whereby the objective lens 1A moves vertically so as to achieve the focusing control.

Figure 4:
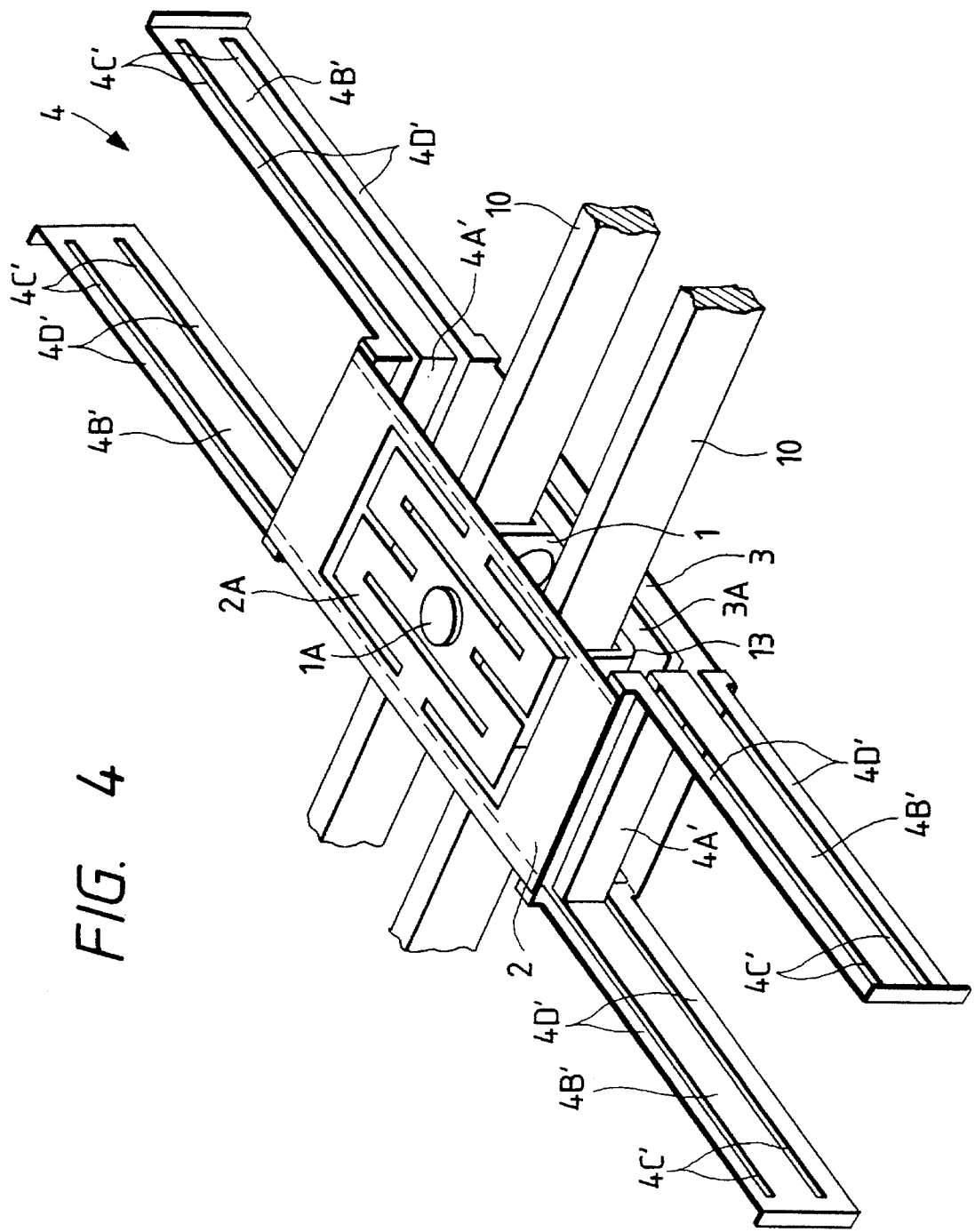
FIG. 4 is a perspective view to show a second embodiment of the objective lens drive apparatus according to the present invention.
Figure 5:
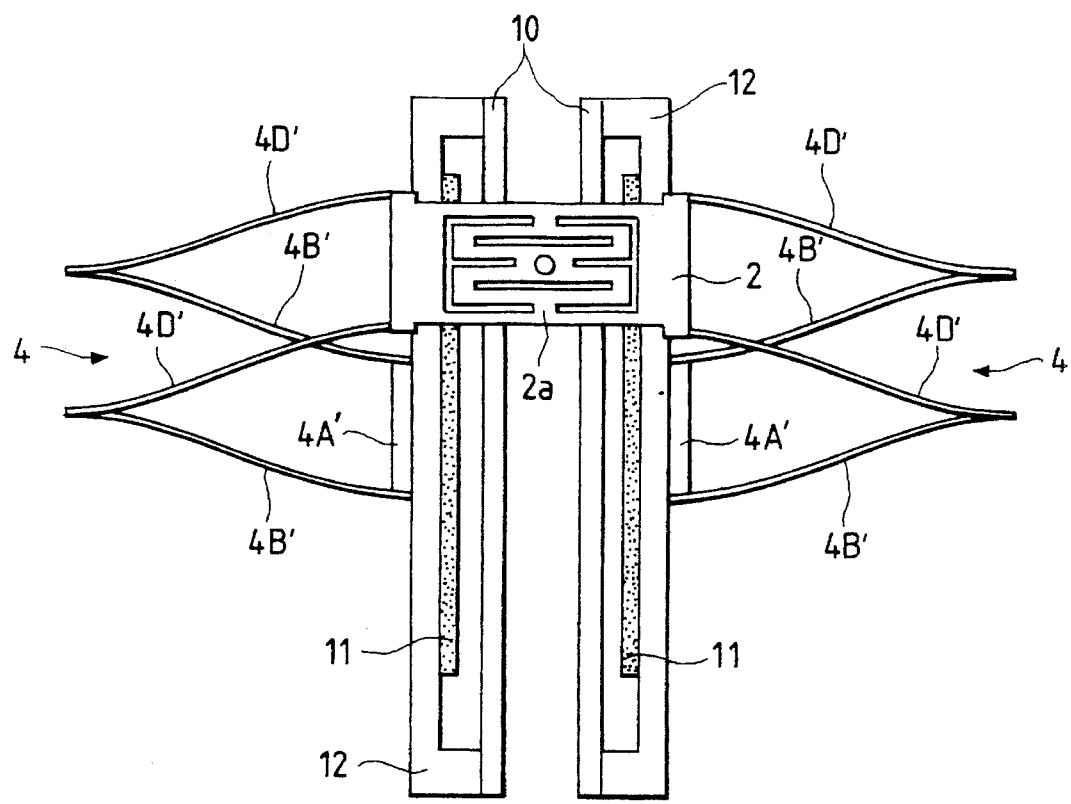
FIG. 5 is a top plan view of the apparatus as shown in FIG. 4.
Figure 6:
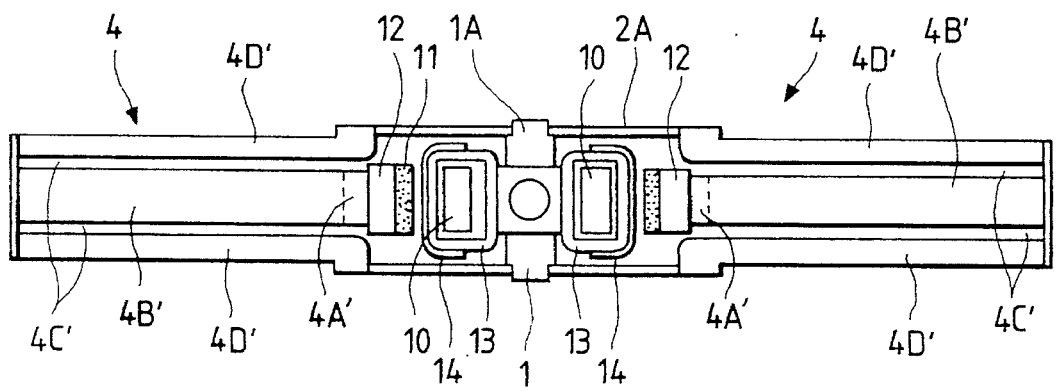
FIG. 6 is an end view as seen from an end of the apparatus as shown in FIG. 4.

A second embodiment according to the present invention is next explained. As shown in FIG. 4 to FIG. 6, the second embodiment is so arranged that both of the left and right ends of the spring member in the direction perpendicular to the tracking direction are supported by folded plate spring mechanisms in place of the composite parallel plate spring mechanisms in the first embodiment as described above. The two folded plate spring mechanisms 4, 4 are disposed in parallel in the direction perpendicular to the tracking direction as to be deflected in the tracking direction with the same elastic force. Each of the plate spring mechanisms 4 is secured at one end to the main body of the apparatus and at another end thereof to the objective lens holder 1. In more detail, each of the folded plate spring mechanism 4, 4 is comprised of a stationary base member 4A' fixed to a back plane of the outer yoke 12; first plate spring portions 4B', 4B' fixed at one end thereof to either end of the stationary base member 4A' (the both ends in the tracking direction) and extending parallel to the direction perpendicular to the tracking direction; and second plate spring portions 4D', 4D' separated from the first spring portions 4B', 4B' through slits 4C', 4C' formed along the first plate spring portions 4B', 4B' above and below them, connected at free ends thereof to the first plate spring portions 4B', 4B' while integrally formed therewith, connected at the opposite ends thereof to the spring members 2 and 3, and extending in parallel with the plate spring portions 4B', 4B'. Each of the folded plate springs 4, 4 may be formed by blanking from a plane sheet.

A necessary driving force is generated by the effects of the direct current applied to the coils 13, 13 and the magnetic fluxes of the magnetic circuits similarly as in the first embodiment. While the objective lens holder 1 is moved by the driving force along the inner yokes 10, 10, the plate spring portions 4B' and 4D' are deflected to permit the objective lens holder 1 to move in the tracking direction while supporting the objective lens holder 1. Similarly as in the first embodiment, when the objective lens holder 1 moves in the tracking direction, the respective parallel plate springs 4B', 4D' of the folded plate spring mechanisms are deflected. Since the base ends of the parallel plate springs 4B are fixed to the stationary base member 4A', the free ends thereof would trace a circular motion. The ends of the plate springs 4D' connected to the spring members 2, 3 would trace a counter circular motion against that. Thus, a composite motion will be on a correct linear trace to move the objective lens holder 1 linearly, because the circular motion traces cancel each other. The objective lens holder 1 is also supported by cooperation of the left and right folded parallel plate spring mechanisms in the present embodiment, so that a higher linearity may be assured in movement in the tracking direction.

Figure 7:
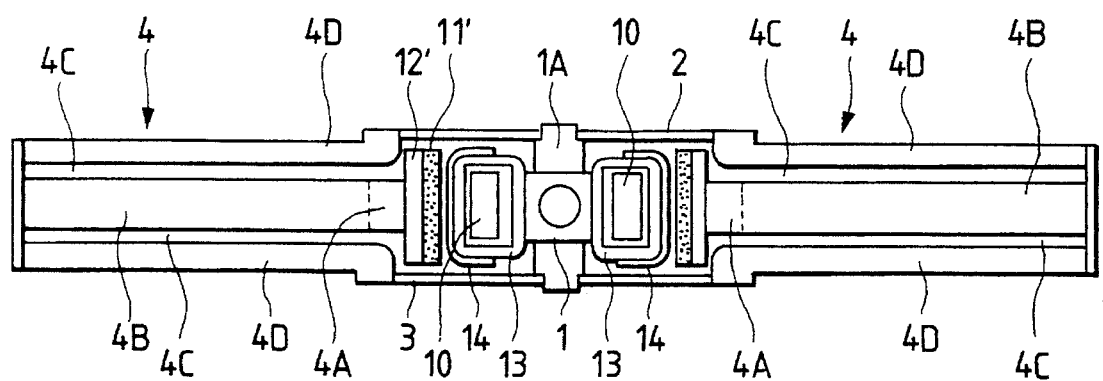
FIG. 7 is an end view to show an objective lens drive apparatus obtained by modifying a part of the apparatus as shown in FIG. 4.
Figure 8:
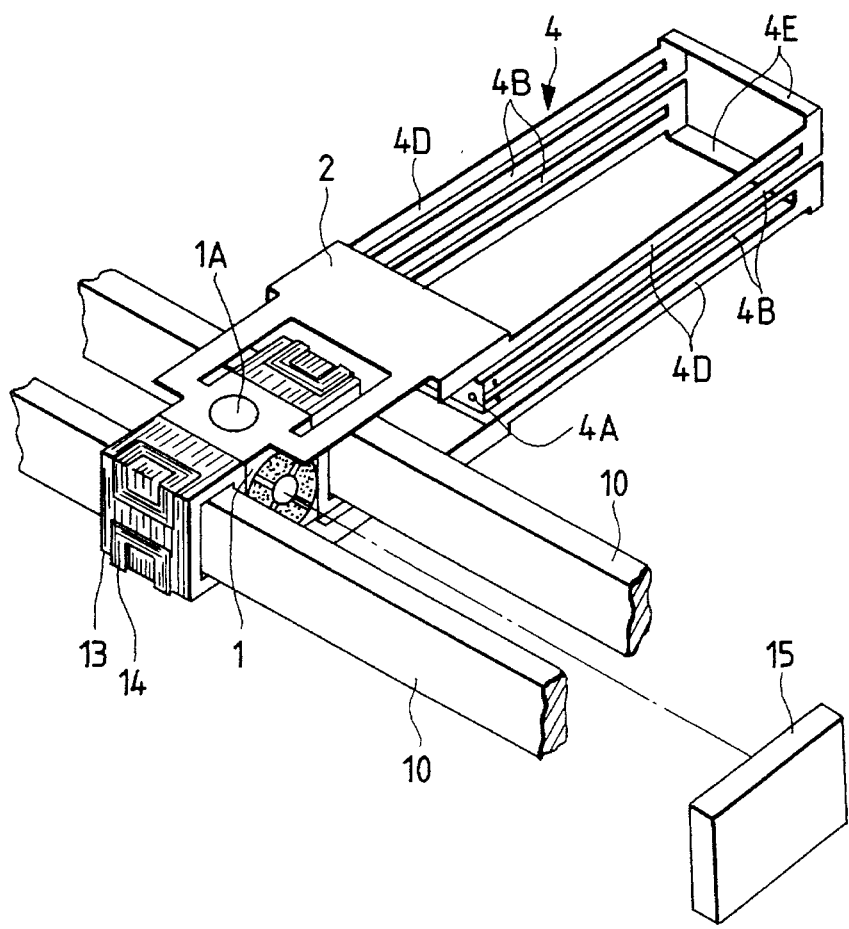
FIG. 8 is a perspective view to show a third embodiment of the objective lens drive apparatus according to the present invention.

When the gimbal springs 2A and 3A formed in the spring members 2 and 3 are deflected in the direction of the optical axis of the objective lens 1A in focusing control, the force center of the tracking coil 13 is vertically deviated to make the force center offset from the center of gravity of the objective lens holder 1. Then, a twisting moment works on the plate spring portions by the deviation. To avoid it, the magnet 11' and the outer yoke 12' may be arranged to have a greater width in the direction of the optical axis (in the vertical direction) than the inner yokes 10 for example as shown in FIG. 7.

Next specifically explained with reference to FIG. 8 to FIG. 12 is a third embodiment of the objective lens drive apparatus according to the present invention, in which the objective lens holder 1 is supported by a single composite parallel plate spring mechanism on one side thereof. The same constituent elements are given the same numerals as those in the first embodiment, and are omitted in the explanation.

In the present embodiment, a parallel plate spring 4B is two-divided into upper and lower portions. The thus-divided parallel plate spring 4B and parallel springs 4D are integrally connected to each other at their free ends similar to the folded plate spring mechanisms in the second embodiment. Further, two bridge portions 4E having the same function as the movable connecting member 4C in the first embodiment bridge to connect between the left and right parallel plate springs 4D, 4D, respectively. Additionally, the objective lens holder 1 is provided with a mirror 16 to direct a laser beam from a light source (for example, a semiconductor laser) in a stationary optical system (not shown) toward the objective lens 1A and to return reflection light.

The optical axis of the laser beam from the stationary optical system is parallel to the inner yokes and the outer yokes. The laser beam is bent at a right angle via the mirror 16 to be directed toward the objective lens 1A (that is, to advance in the direction perpendicular to the disk surface of the recording medium D). For that, optical paths 1B, 1C for guiding the laser beam are formed in the objective lens holder 1.

Figure 9:
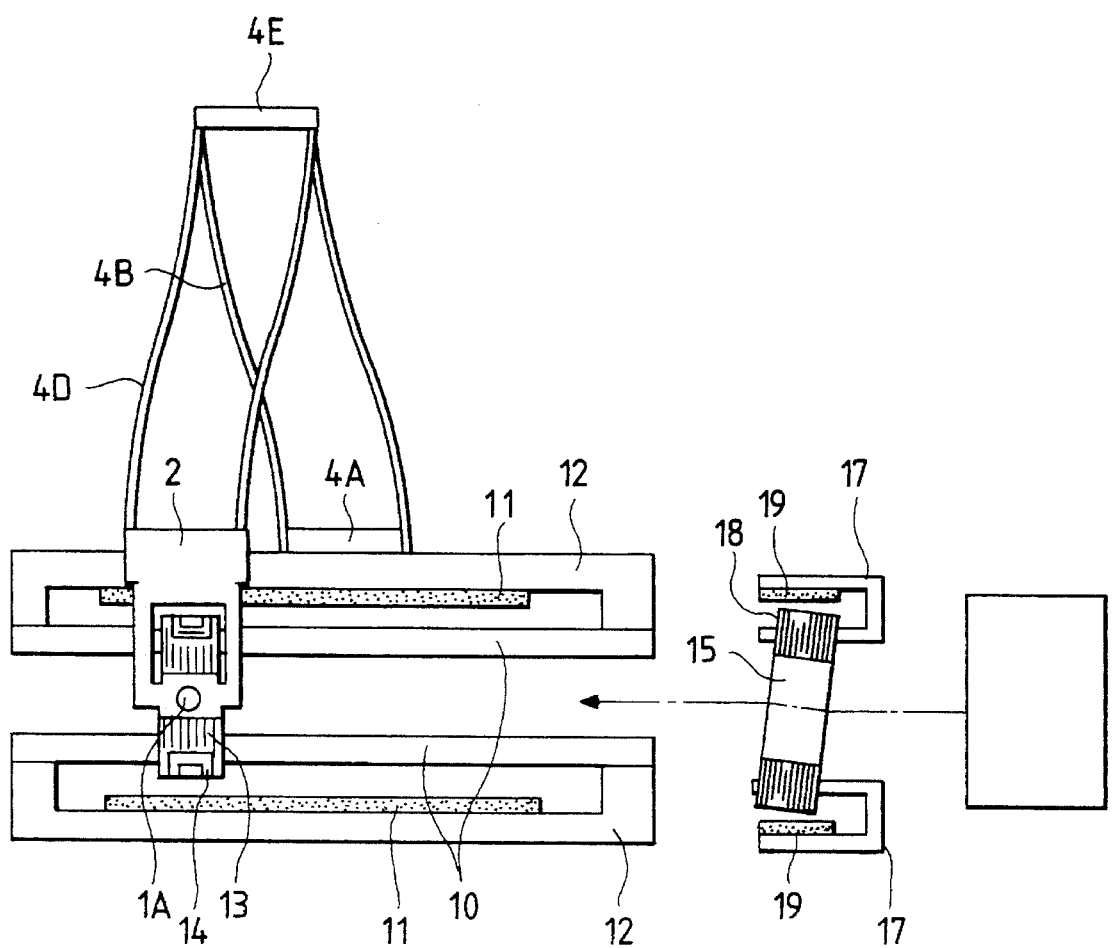
FIG. 9 is a top plan view of the apparatus as shown in FIG. 8.
Figure 10:
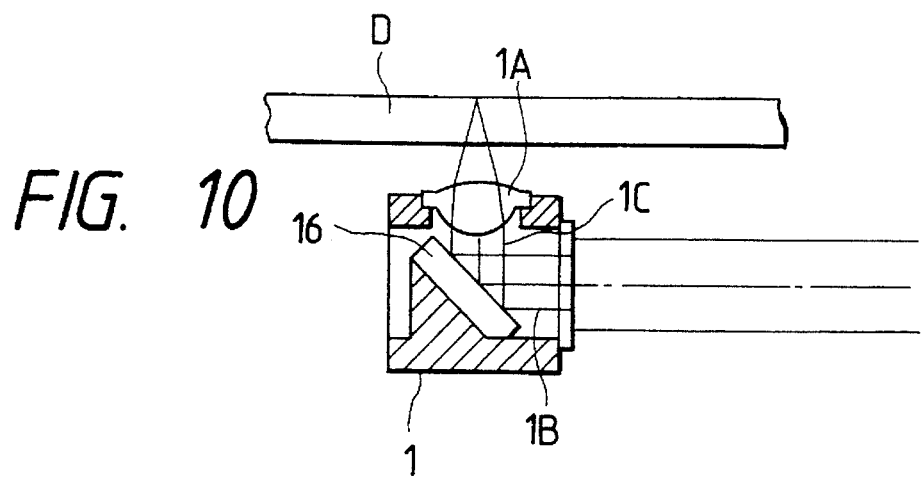
FIG. 10 is a fragmentary vertical section of the apparatus as shown in FIG. 8.
Figure 11:
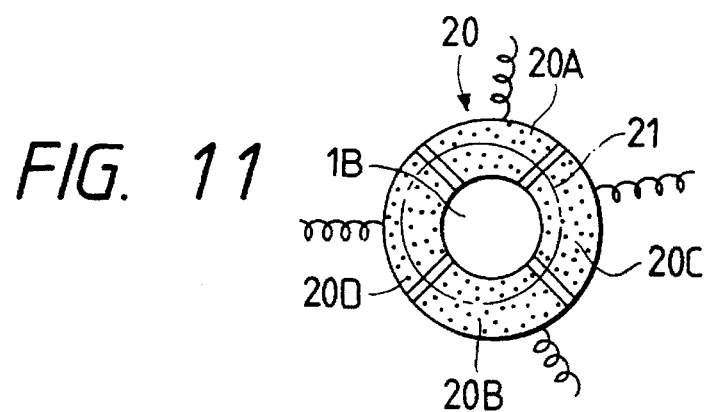
FIG. 11 is a partial end view of the apparatus as shown in FIG. 8.

There is provided a correction optical system in the optical path in which the light emitted from the stationary optical system Is directed toward the mirror 16. The correction optical system comprises a parallel plain plate glass 15 having parallel end planes crossing the optical axis, coils 18, 18 attached to the parallel plain plate glass 15 while surrounding inner yoke portions of yokes 17, 17, and magnets 19, 19 disposed along the yokes 17, 17 such that magnetic fluxes thereof cross the coils 18, 18. The parallel plain plate glass 15 is preferably supported rotatable about a shaft perpendicular to the optical axis. The parallel plain plate glass 15 is inclined relative to the optical axis depending upon a value of the electric current flowing through the coils 18, 18 as shown in FIG. 9, so that the central optical axis of the laser beam directed toward the objective lens holder 1 may be slid left and right in parallel.

Figure 12:
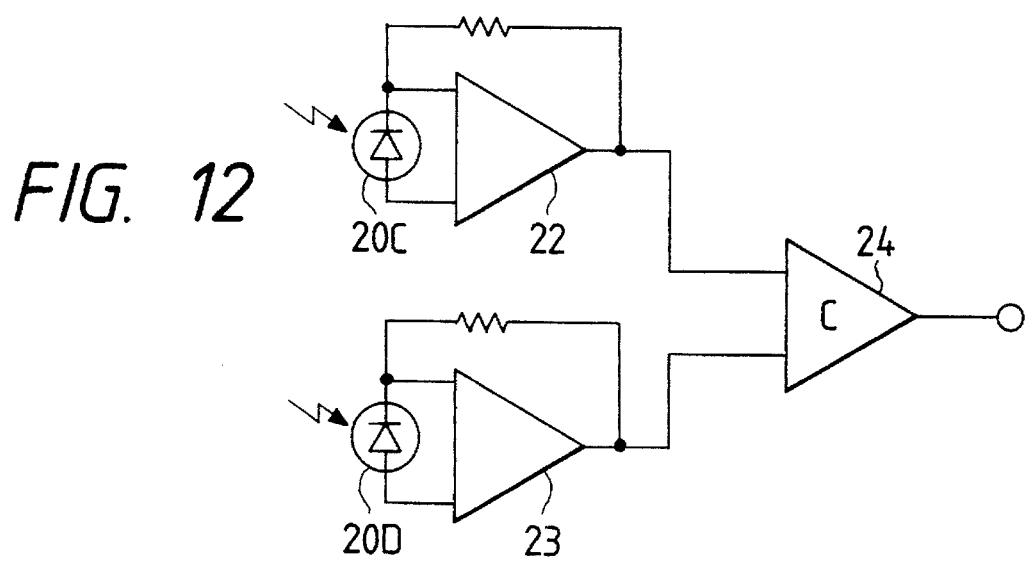
FIG. 12 is a circuit block diagram of an optical axis offset correction control system in the apparatus as shown in FIG. 8.

Further, in the present embodiment, an annular sensor 20 having four-divided photodetectors 20A to 20D surrounding the optical path 1B is provided on the front plane of the objective lens holder 1 facing the stationary optical system. A periphery of optical flux of the laser beam (a circle 21 in this embodiment) is projected onto the sensor 20. If the objective lens holder 1 is deviated left or right in position relative to the optical axis, a difference is made between amounts of received light of the photodetectors 20C and 20D thereby making a difference between values of electric signals generated by the photodetectors 20C and 20D. The electric signals generated are compared in a comparison operation circuit as shown in FIG. 12. In detail, the comparison operation circuit amplifies all output signal of the photodetector 20C at an amplifier 20 and an output signal of the photodetector 20D at an amplifier 23, and compares them at a comparator 24 to obtain a difference signal. A drive signal is produced to correct the positional deviation based on the difference signal, and is fed back to the correction optical system. Similarly, a vertical deviation of the objective lens holder 1 is also checked through a difference of received light amount between the photodetectors 20A and 20B.

As is apparent from the drawings, a necessary drive force is generated by the effects of the direct current applied to the coils 13, 13 and the magnetic fluxes of the magnetic circuits. When the objective lens holder 1 is moved by the drive force along the inner yokes 10, 10, the parallel plate springs 4B and 4D are deflected to permit the objective lens holder 1 to move in the tracking direction while supporting it. In this case, the objective lens holder 1 may linearly move through the deflection of the plate springs 4B, 4D of the parallel link mechanism while canceling the traces of circular motion of the plate springs. In addition, if a positional deviation is caused in the left and right direction of the optical axis in the present embodiment, the correction optical system moves the optical axis in parallel in the left and right direction by an amount to correct the positional deviation as described above, whereby the laser beam may pass through the center of the objective lens 1A to form a correct light spot on the disk surface of the recording medium.

What is claimed is:

1. An objective lens drive device used in an optical information recording/reproducing apparatus to effect at least one of recording and reproducing of information by irradiating a light spot onto a disk-like recording medium, said device comprising:

an objective lens for forming the light spot on the recording medium;

an objective lens holding member for holding said objective lens;

a yoke arranged along a radial direction of the recording medium;

a permanent magnet arranged along the radial direction of the recording medium to face said yoke with a predetermined gap;

a coil provided on said holding member and disposed within the predetermined gap; and a supporting member for supporting said objective lens holding member movably in the radial direction of the recording medium, said supporting member comprising: (i) a first parallel plate spring fixed to said yoke at one end thereof and extending in a direction perpendicular to the direction along which said objective lens holding member moves, said first parallel plate spring having a primary deformation direction, which is substantially coincident with the radial direction of the recording medium, and (ii) a second parallel plate spring arranged parallel to said first parallel plate spring and fixed to a side of said objective lens holding member at one end thereof and extending in the direction perpendicular to the direction along which said objective lens holding member moves, said second parallel plate spring having a primary deformation direction, which is substantially coincident with the radial direction of the recording medium and being connected to said first parallel plate spring with the other end thereof, wherein said objective lens holding member is moved in the radial direction of the recording medium so as to effect tracking and seeking operations of the light spot by a driving force generated by current flowing in said coil and a magnetic field generated in the predetermined gap.

2. An objective lens drive device according to claim 1, wherein said objective lens is held through a gimbal spring mechanism by said objective lens holding member.

3. An objective lens drive device according to claim 1, wherein said first and second plate springs are formed from a single member.

4. An optical information recording/reproducing apparatus for effecting at least one of recording and reproducing of information by irradiating a light beam generated from a light source as a light spot on a disk-like recording medium, said apparatus comprising:

an objective lens for forming the light spot on the recording medium;

an objective lens holding member for holding said objective lens;

a yoke arranged along a radial direction of the recording medium;

a permanent magnet arranged along the radial direction of the recording medium to face said yoke with a predetermined gap;

a coil provided on said objective lens holding member and positioned within the predetermined gap; and a supporting member for supporting said objective lens holding member movably in the radial direction of the recording medium, said supporting member comprising: (i) a first parallel plate spring fixed to said yoke at one end thereof and extending in a direction perpendicular to the direction along which said objective lens holding member moves, said first parallel plate spring having a primary deformation direction, which is substantially coincident with the radial direction of the recording medium, and (ii) a second parallel plate spring arranged parallel to said first parallel plate spring and fixed to a side of said objective lens holding member at one end thereof and extending in the direction perpendicular to the direction along which said objective lens holding member moves, said second parallel plate spring having a primary deformation direction, which is substantially coincident with the radial direction of the recording medium, and being connected to said first parallel plate spring with the other end thereof, wherein said objective lens holding member is moved in the radial direction of the recording medium so as to effect tracking and seeking operations of the light spot by a driving force generated by current flowing in said coil and a magnetic field generated in the predetermined gap.

5. An apparatus according to claim 4, further comprising:

detection means for detecting a displacement of said objective lens holding member with respect to the optical axis of the light beam incident on said objective lens holding member in a direction perpendicular to the surface of the recording medium; and varying means for varying the optical axis position of the light beam incident on said objective lens holding member according to a detection result of said detection means.

6. An apparatus according to claim 5, wherein said varying means is a parallel plate glass having parallel opposite surfaces.

* * * * *

UNITED STATES PATENT AND TRADEMARK OFFICE
CERTIFICATE OF CORRECTION

PATENT NO.   : 5,463,612
DATED        : October 31, 1995
INVENTOR(S)  : Nobuaki DATE It is certified that error appears in the above-indentified patent and that said Letters Patent is hereby corrected as shown below:

ON THE TITLE PAGE:

Item [56], U.S. PATENT DOCUMENTS;

"5,134,727   7/1992   Cau" should read
--5,134,527   7/1992   Cau--.

COLUMN 2:

Line 2, "descried" should read --described--.

COLUMN 5:

Line 7, "Is" should read --is--.

Signed and Sealed this

Nineteenth Day of March, 1996

Attest:

BRUCE LEHMAN

Attesting Officer   Commissioner of Patents and Trademarks